April 16, 1963 S. SARIAN 3,085,441
PRESSURE-DIFFERENTIAL TYPE APPARATUS USEFUL
IN DENSITY AND VOLUME MEASUREMENTS
Filed Aug. 25, 1960 3 Sheets-Sheet 1

INVENTOR.
SUREN SARIAN
BY
Thomas I. O'Brien
ATTORNEY

April 16, 1963 S. SARIAN 3,085,441
PRESSURE-DIFFERENTIAL TYPE APPARATUS USEFUL
IN DENSITY AND VOLUME MEASUREMENTS
Filed Aug. 25, 1960 3 Sheets-Sheet 2

INVENTOR.
SUREN SARIAN
BY
Thomas J. O'Brien
ATTORNEY

United States Patent Office 3,085,441
Patented Apr. 16, 1963

3,085,441
PRESSURE-DIFFERENTIAL TYPE APPARATUS USEFUL IN DENSITY AND VOLUME MEASUREMENTS
Suren Sarian, Niagara Falls, N.Y., assignor to Union Carbide Corporation, a corporation of New York
Filed Aug. 25, 1960, Ser. No. 51,866
11 Claims. (Cl. 73—450)

This invention relates to an apparatus useful in the determination of the bulk density and/or the apparent volume of solid materials.

It has become increasingly important to provide for the highly accurate measurement of physical properties of materials, in particular the bulk density and apparent volume of solid materials.

Accordingly, it is an object of this invention to provide a highly accurate apparatus useful in the determination of the bulk density and/or apparent volume of solid materials.

Other objects will be apparent from the following description and appended claims.

A pressure-differential type apparatus useful in the determination of the bulk density and/or apparent volume of solid materials which satisfies the present invention comprises a vertically extending tube, a pressure-responsive diaphragm sealably fixed to the tube and closing the lower end thereof, and a first liquid provided within the tube. A receptacle is also provided containing a second liquid; the density of the second liquid is at least equal to the density of the material to be measured and is preferably substantially greater. The vertically extending tube is arranged to float in the receptacle in the second liquid and to assume an initial level in the second liquid thereby causing the first liquid to assume an initial height in the vertically extending tube. The initial height of the first liquid in the vertically extending tube is in accordance with the pressure exerted by the second liquid on the pressure-responsive diaphragm sealing the lower end of the tube. A weight-supporting means is provided and fixed to the tube and adapted to be weighted to decrease the buoyancy of the tube in the second liquid. Holding means are also provided and fixed to the vertically extending tube for engaging the material to be measured; the holding means are arranged on the tube so that, when the material to be measured is engaged thereby and when the tube is at its initial level, the material to be measured is completely below the surface of the second liquid. Means for indicating the height of the first liquid in the vertically extending tube and for indicating when the height of the first liquid in the tube is equal to its initial height are also provided so that the measurement of the bulk density and/or apparent volume of the measured material may be readily accomplished.

Figure 1:
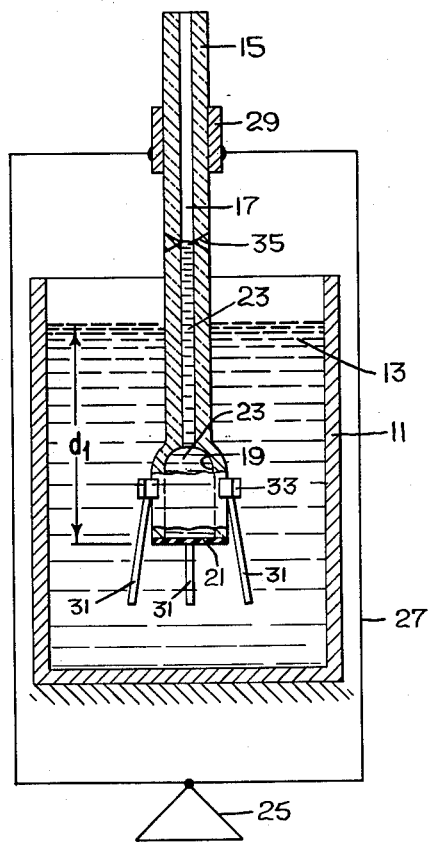
FIGURE 1 shows, partly in section, the apparatus of the present invention arranged in an initial equilibrium condition.

With reference to the drawing, it is seen in FIGURE 1 that a stationary receptacle 11 contains a liquid 13 in which is floating a hollow vertically extending member 15 which is in the form of a tube. Receptacle 11 may be formed of any suitable material; liquid 13 is preferably mercury although other liquids may be employed provided the density thereof is at least equal to the density of the material to be measured. It is preferred that the density of liquid 13 be substantially greater than the density of the material to be measured to improve the sensitivity and convenience of the measurements. The tube 15 has an upper bore 17, preferably transparent, and a lower bore 19. The lower bore 19 is sealed at the lower opening thereof by a pressure-responsive diaphragm 21. Diaphragm 21 is preferably formed of an elastic material such as a thin stretched sheet of rubber or other similarly suitable material. The lower bore 19 sealed by diaphragm 21, constitutes a reservoir for a liquid 23, which may conveniently be colored water and which is seen to partially fill the upper bore 17. It is preferred that the liquid 23 in the tube 15 have a density substantially less than the density of liquid 13 in order to provide improved sensitivity in the performance of bulk density and/or apparent volume measurements. Weight supporting means 25 is shown engaged to rigid arms 27 which may be formed of metal or other suitable material and which are fixedly engaged to tube 15 by a suitable clamp 29. Holding means 31, which may be of any suitable construction, are conveniently fixed to tube 15 by ring 33 for engaging the material to be measured. The preferred holding means are rods arranged in the form of a tripod attached to the tube 15 at a common level, spaced at substantially equal intervals at the periphery of the tube, and extending down at least below the lower end of the tube 15, as shown in the drawing. Glass rods are preferred when mercury is employed as the liquid 13 since glass will not be amalgamated by the mercury.

In the operation of the apparatus of the present invention, the vertically extending tube 15 is arranged, as in FIGURE 1, to float in liquid 13 which will be considered to be mercury for purposes of this description. Under initial equilibrium conditions the tube 15 will float at a particular initial level in the mercury such that diaphragm 21 is located at a particular depth shown as $d_1$ in FIGURE 1. By virtue of the pressure exerted by liquid 13 on the pressure-responsive diaphragm 21, the colored water 23 is caused to assume an initial height in upper bore 17. This height is marked by an index 35, which may be etched on tube 15 or which may be any other suitable means to indicate when the height of the colored water 23 is at its initial height. In addition, an adjustably moveable index may be provided so that the same apparatus may be readily employed with liquids other than mercury and water.

Figure 2:
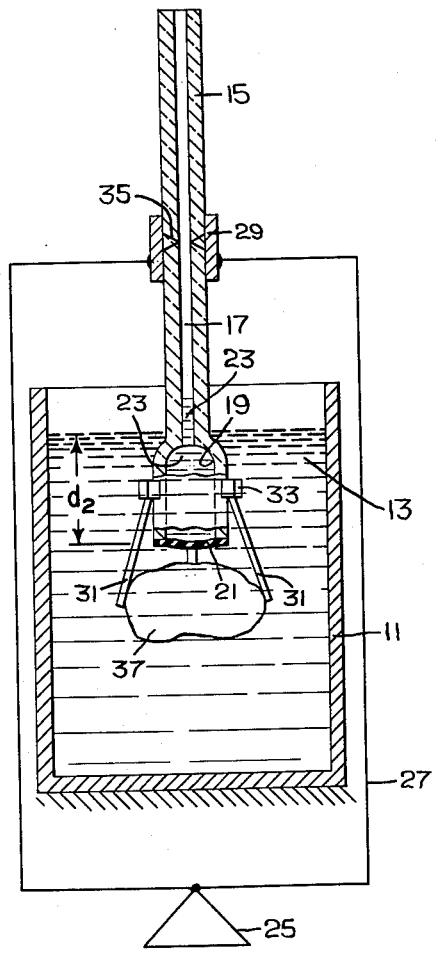
FIGURE 2 shows the apparatus of FIGURE 1 when a material to be measured has been engaged therewith.

When it is desired to measure the bulk density of a material, for example titanium sponge, a sample 37 is engaged by holding means 31 as shown in FIGURE 2. Since the liquid 13, mercury, has a density greater than that of the material to be measured, the tube 15 is caused to assume a higher level in liquid 13 in accordance with Archimedes' law relating to buoyancy and flotation. When the tube 15 is in this higher position, as illustrated in FIGURE 2, the pressure exerted on pressure-responsive diaphragm 21 at depth $d_2$ is less than that exerted under initial equilibrium condition; hence, the height of colored water in tube 15 is less than its initial height.

Figure 3:
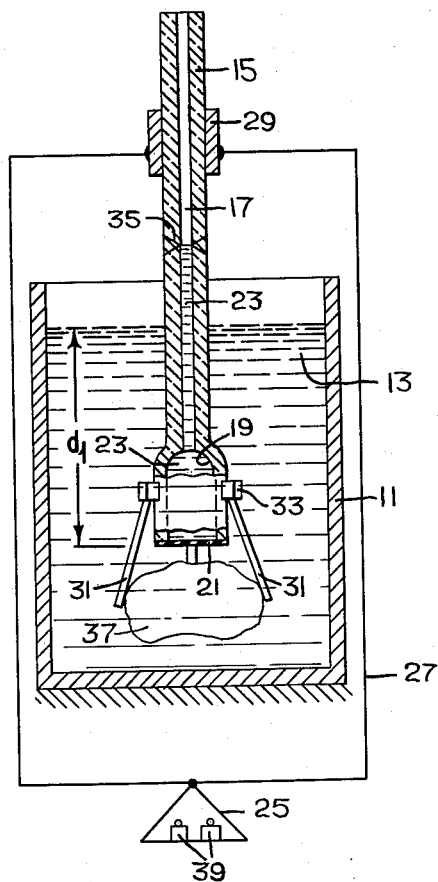
FIGURE 3 shows the apparatus of FIGURE 1 engaged with the material to be measured and returned to its initial equilibrium condition.

Weights 39, in suitable form, are now added to the weight-supporting means 25, as illustrated in FIGURE 3, to decrease the bouyancy of tube 15 so that the tube is caused to return to its initial equilibrium level which is indicated when the height of the colored water 23 returns to its initial height in tube 15. In order to obtain increased sensitivity, the apparatus of the present invention is preferably arranged, as illustrated in the drawing, so that the area of the pressure-sensitive diaphragm 21, exposed to liquid 13, is substantially greater than the horizontal cross-sectional area of the tube at the level thereof corresponding to the initial height of liquid 23 therein.

When the weight-supporting means have been sufficiently weighted to cause the tube 15 to assume its initial equilibrium level, the bulk density of the material 37 may be determined according to the following equations:

$$\rho B = \frac{W_1 \rho_L}{W + W_1}$$

where

W is the weight added to the weight supporting means;
$W_1$ is the weight of the sample material in air;
$\rho B$ is the bulk density of the sample material;
$\rho_L$ is the density of the liquid in which tube 15 is floating.

For the apparatus described above, $\rho_L$ is the density of mercury. When W and $W_1$ are expressed in grams and $\rho_L$ is expressed in grams per cubic centimeter, $\rho B$ is obtained in grams per cubic centimeter.

In addition, the apparent volume, V, of the sample material may be obtained in accordance with the following equation:

$$V = \frac{W + W_1}{\rho_L}$$

V is the apparent volume of the sample material in cubic centimeters when W and $W_1$ are expressed in grams and $\rho_L$ in grams per cubic centimeter.

In the practice of the present invention in the manner described herein, the bulk density of various materials has been measured with an accuracy of ±0.003 gram per cubic centimeter. The sensitivity of the apparatus of the present invention may be altered by varying the ratio of the horizontal cross-section of the lower opening of lower bore 19 with respect to the inner horizontal cross-section of the upper bore 17. The sensitivity increases with increasing values of the ratio.

It is clear from the above description and drawing that in the present invention an accurate, sensitive and easily operated apparatus is provided for use in the measurement of the bulk density and/or apparent volume of solid materials.

What is claimed is:

1. An apparatus useful in the determination of the bulk density and/or apparent volume of solid materials which comprises a longitudinally extending hollow member; a pressure-sensitive diaphragm sealably fixed to said hollow member and closing an end thereof; said hollow member with said pressure-sensitive diaphragm fixed thereto being adapted to be vertically positioned and to contain a first liquid when vertically positioned and also being adapted to float in a second liquid at an initial level therein while containing the first liquid whereby the first liquid is caused to assume an initial height in said hollow member; means for indicating whenever the height of the first liquid in said hollow member is equal to its initial height; weight-supporting means fixed to said hollow member and adapted to be weighted to decrease the buoyancy of said hollow member in the second liquid; and holding means fixed to said hollow member for engaging the material to be measured, said holding means being arranged on said hollow member so that when the material to be measured is engaged thereby and when said weight-supporting means are weighted to cause said hollow member to assume its initial level in the second liquid, the material to be measured is completely below the surface of the second liquid.

2. An apparatus in accordance with claim 1 wherein the area of the pressure-sensitive diaphragm which is adapted to be exposed to the second liquid when said hollow member is floating therein, is substantially greater than the inner cross-sectional area of said hollow member at the portion thereof corresponding to the initial height of the first liquid therein.

3. An apparatus in accordance with claim 1 wherein said holding means comprises at least three rods attached to said hollow member at a common distance from an end of said hollow member being spaced at substantially equal intervals about the periphery of said hollow member and extending beyond the closed end of said hollow member.

4. An apparatus in accordance with claim 1 wherein at least a portion of said hollow member is transparent so that he height of a liquid therein may be observed visually.

5. An apparatus useful in the determination of the bulk density and/or apparent volume of solid materials which comprises a vertically extending hollow member; a pressure-sensitive diaphragm sealably fixed to said hollow member and closing the lower end thereof; a first liquid within said hollow member; a receptacle; a second liquid in said receptacle having a density at least equal to the density of the material to be measured, said vertically extending hollow member being arranged to float in said second liquid to assume an initial level therein and to thereby cause the first liquid to assume an initial height in said hollow member; means for indicating whenever the height of the first liquid in said hollow member is equal to its initial height; weight-supporting means fixed to said hollow member and adapted to be weighted to decrease the buoyancy of said hollow member in said second liquid; and holding means fixed to said hollow member for engaging the material to be measured, said holding means being arranged on said hollow member so that when the material to be measured is engaged thereby and said weight-supporting means are weighted to cause said hollow member to assume its initial level in said second liquid, the material to be measured is completely below the surface of said second liquid.

6. An apparatus according to claim 5 wherein the area of the pressure-sensitive diaphragm exposed to the second liquid is substantially greater than the horizontal cross-sectional area of the vertically extending hollow member at the level thereof corresponding to the initial height of the first liquid therein.

7. An apparatus in accordance with claim 5 wherein said weight-supporting means comprises a tray adapted to receive weights; a pair of rigid arms arranged to support said tray and fixed to said hollow member at a portion thereof above the surface of said second liquid, said arms extending downwardly around said receptacle to support said tray beneath said receptacle.

8. An apparatus in accordance with claim 5 wherein said holding means comprises at least three rods attached to said hollow member at a common level and spaced at substantially equal intervals about the periphery of said hollow member, said rods extending downward below the lower end of said hollow member.

9. An apparatus in accordance with claim 5 wherein at least an upper portion of said hollow member is transparent and wherein said first liquid is colored whereby the height thereof in said hollow member may be observed visually.

10. An apparatus in accordance with claim 5 wherein said first liquid is mercury, said second liquid is a colored liquid having a density substantially less than that of mercury, and said hollow member is at least partially transparent so that the height of the colored liquid in said hollow member may be observed visually.

11. An apparatus useful in the determination of the bulk density and/or apparent volume of a solid material which comprises a vertically extending tube having a transparent upper bore and a lower bore communicating with said upper bore; the horizontal cross-section of said lower bore being substantially greater than the horizontal cross-section of said upper bore; an elastic diaphragm sealably closing the lower end of said lower bore; a colored liquid within said tube completely filling said lower bore and partially filling said upper bore and having a density substantially less than that of mercury; a receptacle; a bath of mercury within said receptacle; said vertically extending tube being arranged to float in said bath of mercury to assume an initial level therein; a pair of downwardly extending rigid arms fixed to said vertically extending tube at a level above the surface of the mercury said arms being of substantially equal length and attached to opposite sides of said tube and extending beyond the sides of said receptacle; a tray adapted to receive weights supported by said arms at a position below the bottom of said receptacle; at least three rods attached to the lower portion of said vertically extending tube at a common level and spaced at substantially equal intervals about the periphery of said tube, said rods extending downward below said diaphragm and adapted to engage a sample of the material to be measured; and means on said transparent tube for indicating the height of the colored liquid in the upper bore thereof.

References Cited in the file of this patent

UNITED STATES PATENTS

| | | |
|---|---|---|
| 536,316 | Lohnstein | Mar. 26, 1895 |
| 1,075,477 | Hutchinson | Oct. 14, 1913 |
| 2,087,146 | Hawkins | July 13, 1937 |
| 2,198,351 | Thielers et al. | Apr. 23, 1940 |
| 2,357,639 | Elias | Sept. 5 1944 |
| 2,952,157 | Hayden et al. | Sept. 13, 1960 |